United States Patent [19]
Schneider, Jr.

[11] 3,885,501
[45] May 27, 1975

[54] FAIL-SAFE ELECTRICAL TIMER
[75] Inventor: Clayton J. Schneider, Jr., East Aurora, N.Y.
[73] Assignee: Calspan Corporation, Buffalo, N.Y.
[22] Filed: Nov. 16, 1973
[21] Appl. No.: 416,723

[52] U.S. Cl. ............................ 102/70.2 R; 102/19.2
[51] Int. Cl. .......................... F42c 7/02; F42b 23/26
[58] Field of Search.......... 102/70.2 R, 19.2, 18, 16, 102/8

[56] References Cited
UNITED STATES PATENTS

| | | | |
|---|---|---|---|
| 3,170,399 | 2/1965 | Hinman, Jr. ................... | 102/70.2 R |
| 3,384,017 | 5/1968 | Lazarus et al.................. | 102/70.2 R |
| 3,548,749 | 12/1970 | Drietzler ....................... | 102/70.2 R |

Primary Examiner—Benjamin A. Borchelt
Assistant Examiner—C. T. Jordan
Attorney, Agent, or Firm—Allen J. Jaffe

[57] ABSTRACT

A device to deactivate an electrical circuit after a preset period of time. Deactivation is accomplished by the depletion of the power supply battery through a preset load which is an oscillator that is connected through an AC link into the circuit to be deactivated.

5 Claims, 2 Drawing Figures

FIG. I

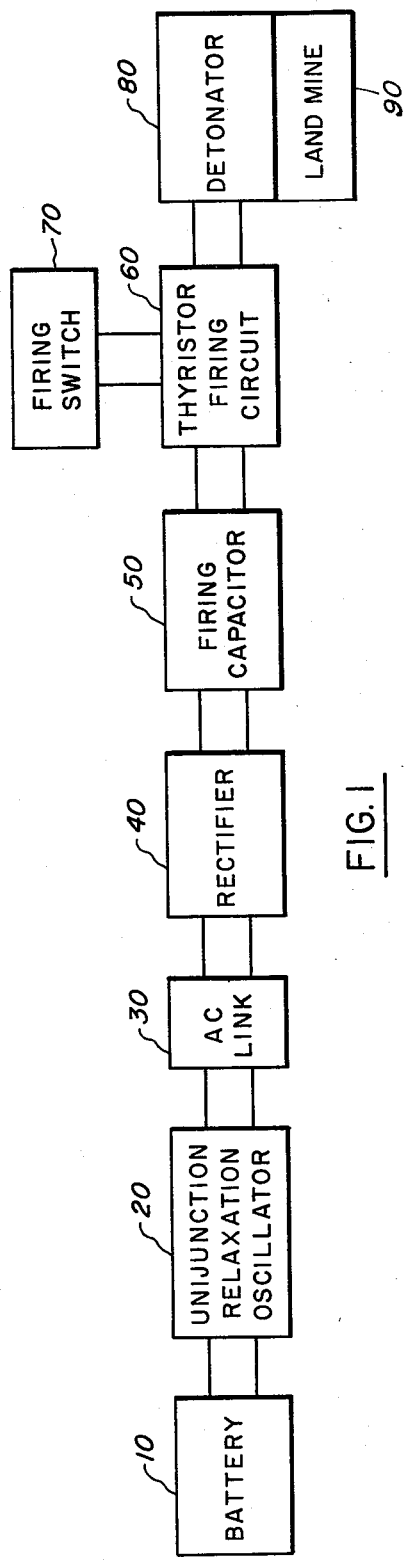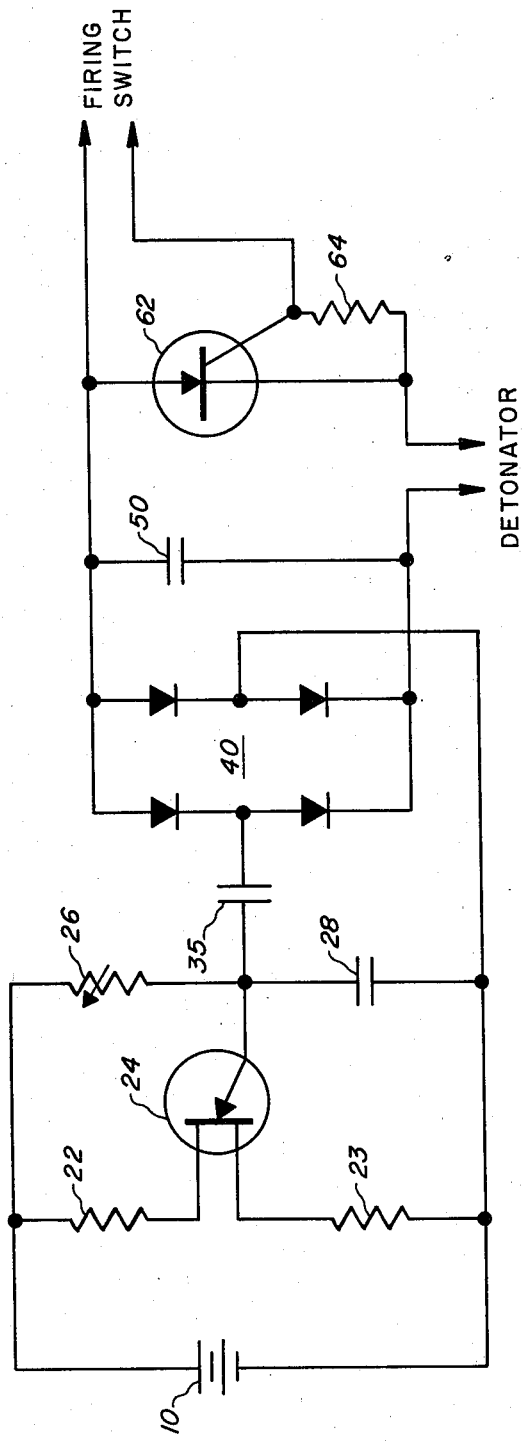

FAIL-SAFE ELECTRICAL TIMER

It is often desirable to deactivate an electrical circuit after a preset period of time. One such application is in the fuzing of land mines since a land mine fuze is desirably neutralized, i.e. "turned off" after a preset time. One method of accomplishing this function is by the intentional depletion of the power supply battery through a preset load, i.e. a depletion resistor. However, failure of the adjustable battery drain resistor can serve to extend the active life of the land mine and thereby present great danger in the subsequent recovery operation.

It is an object of this invention to provide a fail-safe electrical timer for deactivating an electrical circuit.

It is a further object of this invention to provide an electrical circuit that will be deactivated upon the failure of any component.

It is an additional object of this invention to provide a fail-safe device for disarming a fuze mechanism after a preset period of time.

It is a still further object of this invention to provide an electrical circuit having means for indicating the condition of the circuit. These objects, and others as will become apparent hereinafter, are accomplished by the present invention.

Conventional battery depletion timing mechanisms use a simple resistive load to deplete the battery. In such a device the opening of the depletion resistor causes the unit to remain active much beyond the intended turn-off date and thereby can present a great danger in land mine recovery.

According to the present invention an electrical circuit is deactivated after a preset period of time by the depletion of the power supply battery through a preset load. It differs from former systems in using an oscillator as the battery depletion load and connecting the output through an AC link into the circuit to be deactivated. Such a system provides: (1) fail-safety since a component failure will immediately deactivate the system rather than extend its life; (2) a depletion rate test by determining the oscillator frequency; and, (3) a remote indication of function by the reception of RF harmonics.

BRIEF DESCRIPTION OF THE DRAWINGS

For a fuller understanding of the present invention, reference should now be had to the following detailed description thereof taken in conjunction with the accompanying drawings wherein:

FIG. 1 is a block diagram showing the principal circuit components; and

FIG. 2 is a schematic diagram of the circuit.

DESCRIPTION OF THE PREFERRED EMBODIMENT

With reference to FIGS. 1 and 2, battery 10 is connected to low-current unijunction relaxation oscillator 20 which is made up of resistors 22 and 23, low-current unijunction transistor 24, variable, charging resistor 26 and capacitor 28. Relaxation oscillator 20 is connected to rectifier 40 through an AC link 30 which may be in the form of a capacitor 35, as shown, or a transformer. Rectifier 40, which is illustrated in the form of a diode bridge, is connected to firing capacitor 50 which is connected to thyristor firing circuit 60 which includes thyristor 62 and resistor 64. Thyristor firing circuit 60 is connected with firing switch 70 and detonator 80 which may be arranged to initiate land mine 90 or other appropriate explosive devices.

OPERATION

Battery 10 is continuously depleted by means of unijunction relaxation oscillator 20. The depletion time for the battery 10 is controlled by varying charging resistor 26 which forms a part of unijunction relaxation oscillator 20. The pulses or sawtooth wave forms available from the unijunction relaxation oscillator 20 are connected through AC link 30 to rectifier 40 where they are rectified and the resultant DC is used to charge firing capacitor 50 which is in a circuit with thyristor firing circuit 60, firing switch 70 and detonator 80. When firing switch 70 is closed a circuit is completed which permits firing capacitor 50 to discharge through detonator 80 which initiates an explosive charge in land mine 90. When switch 70 is open, resistor 64 which is of a relatively high resistance acts to stabilize thyristor 62 in a non-conducting condition.

While operating with firing switch 70 open, a signal is broadcast which may be picked up in the audio range by a probe connected to a high gain audio amplifier or, more simply, in the RF range, by a small transistor portable radio placed anywhere within about 6 inches of the circuit. If the power is removed or any resistor or capacitor in the oscillator is opened or shorted, oscillation ceases, the broadcast signal disappears and firing capacitor 50 bleeds down below 10 millivolts in a few seconds.

The batteries will be chosen for the required characteristics of voltage, shelf life, size, etc., from among cells of the type showing a depletion curve with a sharp break near the point of battery exhaustion.

Although a preferred embodiment of the present invention has been illustrated and described, other changes will occur to those skilled in the art. It is therefore intended that the scope of the present invention is to be limited only by the scope of the appended claims.

I claim:

1. A fail-safe electrical timer which will become deactivated after a preselected time and upon the intervening failure of a component including:
   power means;
   oscillator means driven by said power means and producing an AC output;
   rectifier means for rectifying said AC output;
   firing capacitor means charged by said rectifier means;
   thyristor firing circuit means including a normally open firing switch and a detonator connected to said firing capacitor means whereby upon the closing of said firing switch the said firing capacitor means is allowed to discharge through and thereby activate said detonator.

2. The fail-safe electrical timer of claim 1 further including an AC link means for providing a connection between said oscillator means and said rectifier means.

3. The fail-safe electrical timer of claim 1 wherein said oscillator means includes a variable, charging resistor for controlling the depletion time for the power means.

4. The fail-safe electrical timer of claim 1 wherein said thyristor firing circuit means further includes a thyristor and a resistor for stabilizing said thyristor in a nonconducting condition when said firing switch is open.

5. The fail-safe electrical timer of claim 1 wherein said power means is a battery and said detonator is connected to a land mine.

* * * * *